United States Patent
Kushizaki

[11] Patent Number: 6,134,380
[45] Date of Patent: *Oct. 17, 2000

[54] EDITING APPARATUS WITH DISPLAY OF PRESCRIBED INFORMATION ON REGISTERED MATERIAL

[75] Inventor: Makoto Kushizaki, Kanagawa, Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/290,987

[22] Filed: Apr. 13, 1999

Related U.S. Application Data

[63] Continuation of application No. PCT/JP98/03639, Aug. 14, 1998.

[30] Foreign Application Priority Data

Aug. 15, 1997 [JP] Japan ..................................... 9-220550

[51] Int. Cl.$^7$ ....................................................... H04N 5/76
[52] U.S. Cl. ............................... 386/55; 345/328; 386/52
[58] Field of Search ................................. 386/55, 52, 64; 345/328; 360/13; 368/83; 364/514; 395/133, 821

[56] References Cited

U.S. PATENT DOCUMENTS

| | | | |
|---|---|---|---|
| 5,237,648 | 8/1993 | Mills et al. ............................... | 395/133 |
| 5,404,316 | 4/1995 | Klingler et al. .......................... | 364/514 |
| 5,548,777 | 8/1996 | Woo ......................................... | 395/821 |
| 5,760,767 | 6/1998 | Shore et al. ............................. | 345/328 |
| 5,781,188 | 6/1998 | Amiot et al. ............................. | 345/328 |

FOREIGN PATENT DOCUMENTS

| | | |
|---|---|---|
| 0 774 756 A2 | 5/1997 | European Pat. Off. . |
| 9-44524 | 2/1997 | Japan . |
| 9-200687 | 7/1997 | Japan . |
| 9-298712 | 11/1997 | Japan . |

*Primary Examiner*—Thai Tran
*Attorney, Agent, or Firm*—Frommer Lawrence & Haug, LLP; William S. Frommer; Dexter T. Chang

[57] ABSTRACT

An editing apparatus with a display for displaying predetermined information relating to registered materials to be edited and moreover, out of prescribed information relating to registered material to be edited, displaying some or the whole of the information relating to materials to be edited used for an editing list with a prescribed color or displaying prescribed decision information capable of deciding whether the materials to be edited are used for the editing list by making it correspond to information. Thereby, an operator can immediately and securely decide whether the materials to be edited are used for the editing list or not, in accordance with the color of the information relating to each displayed material to be edited or the corresponding decision information.

2 Claims, 10 Drawing Sheets

EDITING APPARATUS WITH DISPLAY OF PRESCRIBED INFORMATION ON REGISTERED MATERIAL

This is a continuation of copending International Application PCT/JP98/03639 having an international filing date of Aug. 14, 1998.

TECHNICAL FIELD

The present invention relates to an editing apparatus, and particularly, is preferably applied to a nonlinear editing apparatus.

BACKGROUND ART

Conventionally, an editing apparatus is constituted so as to reproduce video and audio signals recorded in a video tape, by controlling a video tape recorder in accordance with operations by an operator and to display video on a display or output audio through a speaker in accordance with the reproduced video and audio signals.

Therefore, in this type of the editing apparatus, an operator designates and enters a plurality of desired portions of video displayed on a display and a plurality of desired portions of audio output through a speaker, confirming the video and audio, so that an editing list can be created which specifies an editing sequence showing how these registered video and audio (hereinafter, referred to as clip) are connected to each other to obtain edited video and edited audio.

However, an editing apparatus (hereafter, referred to as a nonlinear editing apparatus) is recently proposed which makes it possible to create an editing list by temporarily capturing video and audio signals of a desired clip recorded on a video tape, into a hard disk and using the video and audio signals taken in the hard disk.

The above type of the nonlinear editing apparatus is normally provided with various functions using the high-speed accessibility and random accessibility of a hard disk, so that an operator can easily and quickly create an editing list by using these functions.

The nonlinear editing apparatus having the above structure makes it possible to generate edited video and edited audio by executing an edition processing using video and audio signals taken in a hard disk in accordance with the editing list.

Therefore, in the case of the nonlinear editing apparatus, video and audio signals of a clip used for the created editing list cannot be erased before the edition processing according to the editing list is completed.

Therefore, in the case of the nonlinear editing apparatus having the above structure, to record video and audio signals of a desired clip exceeding the capacity of a hard disk, it is necessary to select video and audio signals of a clip not used for an editing list and erase the signals from the hard disk.

However, a conventional nonlinear editing apparatus has problems in use that it is difficult to easily decide whether a clip taken in a hard disk is used for an editing list and thereby, it is bother in erasing the video and audio signals of the unnecessary clip from the hard disk.

DISCLOSURE OF THE INVENTION

The present invention is made to solve the above problems and its object is to provide an editing apparatus for extremely improving the manipulability.

In the case of an editing apparatus of the present invention, to solve the above problems, display means is provided for displaying predetermined information on an registered material to be edited, the display means displays some or the whole of the information on the registered material to be edited used for an editing list out of the predetermined information on the registered material to be edited with a predetermined color or displays predetermined decision information capable of deciding whether the material to be edited is used for the editing list by making the decision information correspond to information.

As a result, an operator can instantaneously and securely hold whether the material to be edited displayed on display means is used for an editing list or not, in accordance with the information on the material to be edited or the corresponding decision information.

BEST MODE FOR CARRYING OUT THE INVENTION

Hereafter, an embodiment of the present invention is described in detail.

(1) Structure of Editing Apparatus of This Embodiment

Figure 1:
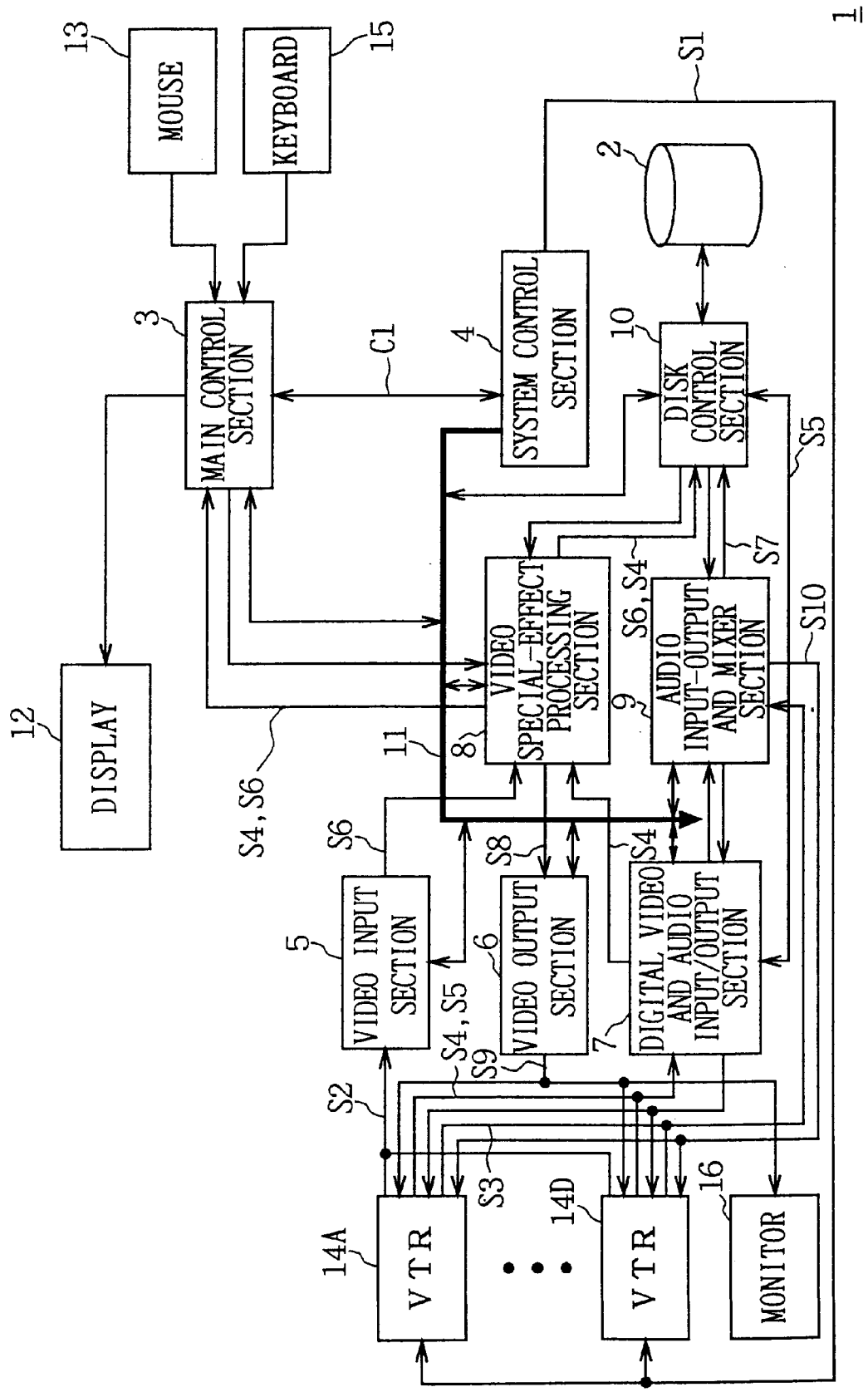
FIG. 1 is a block diagram showing the structure of the editing apparatus of this embodiment.

In FIG. 1, symbol 1 denotes an editing apparatus of this embodiment as a whole, which can enter desired portions of video and audio recorded in a video tape as a clip and moreover, take video signals and audio signals of a desired clip into the hard disk of a hard disk drive 2 out of clips registered at this time or previously registered.

Moreover, the editing apparatus 1 can create an editing list specifying an editing sequence for obtaining desired edited video and audio by connecting registered clips in a desired state and moreover, actually execute the edition processing in accordance with the created editing list and record the obtained edited video and edited audio on a video tape.

That is, the editing apparatus 1 is constituted by connecting a main control section 3, system control section 4, video input section 5, video output section 6, digital video and audio input/output section 7, video special-effect processing section 8, audio input/output and mixer section 9, and disk control section 10 to each other through a control bus 11.

In this case, the main control section 3 makes a display 12 initially display a predetermined operation screen (hereafter referred to as a main screen). Moreover, when a clip entry mode is selected by operating a mouse 13 under the above state and the reproducing operation instructions for any one of a plurality of video tape recorders 14A to 14D connected to the editing apparatus 1 are input, the main control section 3 transmits a control command C1 corresponding to the input instruction to the system control section 4.

The system control section 4 transmits a control signal S1 to the corresponding video tape recorder 14A to 14D in accordance with the supplied control command C1 to make the tape recorder reproduce video signals and audio signals recorded in a video tape.

As a result, an analog video signal S2 and analog audio signal S3 and a digital video signal S4 and digital audio signal S5 are output from the video tape recorder 14A to 14D, the analog video signal S2 and analog audio signal S3 are supplied to the video input section 5 and audio input/output and mixer section 9 respectively and the digital video signal S4 and digital audio signal S5 are supplied to the digital video and audio input/output section 7.

In this case, the system control section 4 controls either the video input section 5 and audio input/output and mixer section 9 or the digital video and audio input/output section 7 through the control bus 11 to make it take either the analog video signal S2 and analog audio signal S3 or the digital video signal S4 and digital audio signal S5, which are output from the video tape recorder 14A to 14D.

Thus, when the analog video signal S2 is taken through the video input section 5, it is digital-converted in the video input section 5 and thereafter, supplied to the video special-effect processing section 8 as a digital video signal S6. When the digital video signal S4 is taken through the digital video and audio input/output section 7, it is directly supplied to the video special-effect processing section 8.

In this case, the video special-effect processing section 8 transmits the digital video signals S6 and S4 supplied from the video input section 5 or digital video and audio input/output section 7 to the main control section 3 based on the control of the system control section 4. Thus, a video based on the digital video signals S6 and S4 is displayed at a predetermined position on the main screen of the display 12 under the control by the main control section 4.

Moreover, when the analog audio signal S3 is taken in the above case, it is directly transmitted to a not-illustrated speaker from the audio input/output and mixer section 9. Furthermore, when the digital audio signal S5 is taken, it is analog-converted in the audio input/output and mixer section 9 and then, transmitted to the speaker.

Thereby, in the editing apparatus 1, an operator can designate desired portions of video and audio by using the mouse 13 and keyboard 15 in accordance with the video displayed on the display 12 and the voices output through a speaker and moreover, use the desired portions as a clip and thereby, enter the data relating to the time code and material length (duration) of an in-point and out-point of the clip in the main control section 3.

In this case, when a taking mode is previously selected, the main control section 3 transmits the control command C1 corresponding to the mode to the system control section 4.

The system control section 4 transmits the control signal S1 to the corresponding video tape recorder 14A to 14D in accordance with the supplied control command C1 and thereby, makes the video tape recorder 14A to 14D reproduce video and audio of a designated clip and moreover, controls either the video input section 5 and audio input/output and mixer section 9 or the digital video and audio input/output section 7 through the control bus 11 in order to take either the analog video signal S2 and analog audio signal S3 or the digital video signal S4 and digital audio signal S5, which are output from the video tape recorder 14A to 14D.

As a result, when the analog video signal S2 is taken through the video input section 5, it is digital-converted in the video input section 5 and thereafter, transmitted to the disk control section 10 through the video special-effect processing section 8 as a digital video signal S6. When the digital video signal S4 is taken through the digital video and audio input/output section 7, it is directly transmitted to the disk control section 10.

Moreover, when the analog audio signal S3 is taken through the audio input/output and mixer section 9, it is digital-converted in the audio input/output and mixer section 9 and thereafter, transmitted to the disk control section 14 as a digital audio signal 7. When the digital audio signal S5 is taken through the digital video and audio input/output section 9, it is directly transmitted to the disk control section 10.

Moreover, in accordance with the command given from the system control section 4 through the control bus 11 the disk control section 10 successively takes the digital video signals S6 and S4 supplied from the video special-effect processing section 8 or digital video and audio input/output section 7 and the digital audio signals S7 and S5 supplied from the audio input/output and mixer section 9 or digital video and audio input/output section 7 and supplies these signals to the hard disk drive 2 to make the disk drive 2 record the signals in designated address positions of the hard disk.

Thus, the editing apparatus 1 can reproduce video and audio of a designated clip from a video tape and take them into the hard disk drive 2.

On the other hand, when clips are registered as described above, the main control section 3 makes the display 12 display a list of registered clips on the main screen displayed on the display 12.

Then, an operator can create an editing list specifying edition contents showing how to connect clips to each other, by using the main screen. Moreover, the operator can confirm edited video and edited audio according to the editing list after or while creating the editing list.

Actually, when the preview mode for edited video and audio based on an editing list is selected after or while creating the editing list, the main control section 3 transmits the control command C1 corresponding to the mode to the system control section 4.

The system control section 4 transmits the control signal S1 to the corresponding video tape recorder 14A to 14D when necessary in accordance with the supplied control command C1 in order to make the video tape recorder 14A to 14D reproduce video and audio of a clip used for the edition processing and moreover, controls the disk control section 10 through the control bus 11 according to necessity in order to make the hard disk drive 2 reproduce the video and audio of the clip used for the edition processing.

As a result, the video tape recorder 14A to 14D outputs the analog video signal S2 and analog audio signal S3, and the digital video signal S4 and digital audio signal S5 of a designated clip, the analog video signal S2 and analog audio signal S3 are supplied to the video input section 5 and the audio input/output and mixer section 9 respectively, and the digital video signal S4 and digital audio signal S5 are supplied to the digital video and audio input/output section 7.

The system control section 4 controls either the video input section 5 and the audio input/output and mixer section 9 or the digital video and audio input/output section 7 through the control bus 11, in order to take either the analog video signal S2 and analog audio signal S3 or the digital video signal S4 and digital audio signal S5, which are output from the video tape recorder 14A to 14D.

Thus, when the analog video signal S2 is taken through the video input section 5, it is digital-converted in the video input section 5 and thereafter, supplied to the video special-effect processing section 8 as the digital video signal S6. When the digital video signal S4 is taken through the digital video and audio input/output section 7, it is directly supplied to the video special-effect processing section 8.

In this case, the video special-effect processing section 8 performs a special effect processing to the supplied digital video signals S6 and S4 of each clip into a designated state under the control of the system control section 4 according to necessity. Moreover, the video special-effect processing section 8 inserts video data such as title letters or various graphics supplied from the main control section 4 according to necessity between the digital video signals S6 and S4 of each clip, or superimposes the video data onto the digital video signals S6 and S4. A digital edited-video signal S8 thus obtained is transmitted to the video output section 6.

Then, the video output section 6 analog-converts the supplied digital edited-video signal S8 under the control of the system control section 4 and transmits an obtained edited-video signal S9 to a monitor 16.

In this time, when the analog audio signal S3 out of the analog audio signal S3 and digital audio signal S5 output from the video tape recorder 14A to 14D is taken through the audio input/output and mixer section 9, it undergoes an edition processing such as mixing in the audio input/output and mixer section 9 according to necessity and thereafter, it is transmitted to a speaker as an edited audio signal. When the digital audio signal S5 is taken through the digital video and audio input/output section 7, it is analog-converted in the audio input/output and mixer section 9 and undergoes the edition processing such as mixing and thereafter, it is transmitted to a speaker as an edited audio signal.

As a result, in the editing apparatus 1, an edited video based on the edited video signal S9 is displayed on the monitor 16 and an edited audio based on an edited audio signal is output through a speaker. Thus, an operator can confirm an edited video and edited audio based on an editing list.

Moreover, after an editing list is created, the mouse 13 or keyboard 15 is operated to input its execution instruction, the main control section 3 transmits the control command C1 corresponding to the instruction to the system control section 4.

The system control section 4 transmits the control signal S1 to the corresponding video tape recorder 14A to 14D in accordance with the supplied control command C1 when necessary and thereby, makes the video tape recorder 14A to 14D reproduce video and audio of a clip used for the edition processing and moreover, controls the disk control section 10 through the control bus 11 according to necessity. Thereby, the system control section 4 makes the hard disk drive 2 reproduce video and audio of a clip used for the edition processing.

As a result, similarly to the case of the preview mode described above, the digital video signals S6 and S4 of a necessary clip are supplied to the video special-effect processing section 8 from the video tape recorder 14A to 14D via the video input section 5 or digital video and audio input/output section 7, or the digital video signals S6 and S4 of a necessary clip are supplied to the section 8 from the hard disk drive 2 via the disk control section 10.

Moreover, in this time, the analog audio signal S3 or digital audio signal S5 of a necessary clip is supplied to the audio input/output and mixer section 9 from the video tape recorder 14A to 14D directly or via the digital video and audio input/output section 7, or the digital audio signals S7 and S5 of a necessary clip are supplied to the section 9 from the hard disk drive 2 via the disk control section 10.

Then, the video special-effect processing section 8 applies the special-effect processing to the supplied digital video signals S6 and S4 of each clip according to necessity under the control of the system control section 4 similarly to the case of the above preview mode. Thus obtained digital edited video signal S8 comprising the video signal of an edited video is transmitted to the video output section 6.

In this time, the video output section 6 analog-converts the supplied digital edited-video signal S8 under the control of the system control section 4 and transmits the obtained edited-video signal S9 to the corresponding video tape recorder 14A to 14D.

Moreover, in this time, the audio input/output and mixer section 9 applies the edition processing such as mixing to the supplied analog audio signal S2 or digital audio signals S5 and S7 of each clip according to necessity similarly to the case of the above-described preview mode under the control of the system control section and transmits an edited-audio signal S10 thus obtained to the corresponding video tape recorder 14A to 14D.

Furthermore, in this time, the control signal S1 is supplied to the video tape recorder 14A to 14D from the system control section 4 and thus, the video tape recorder 14A to 14D records the edited-video signal S9 supplied from the video output section 6 and the edited-audio signal S10 supplied from the audio input/output and mixer section 9 in specified positions of a video tape in accordance with the control signal S1.

Thus, the editing apparatus 1 can edit video and audio of a designated clip into a designated state in accordance with a created editing list to record them on a video tape.

(2) Structure of Main Control Section

Figure 2:
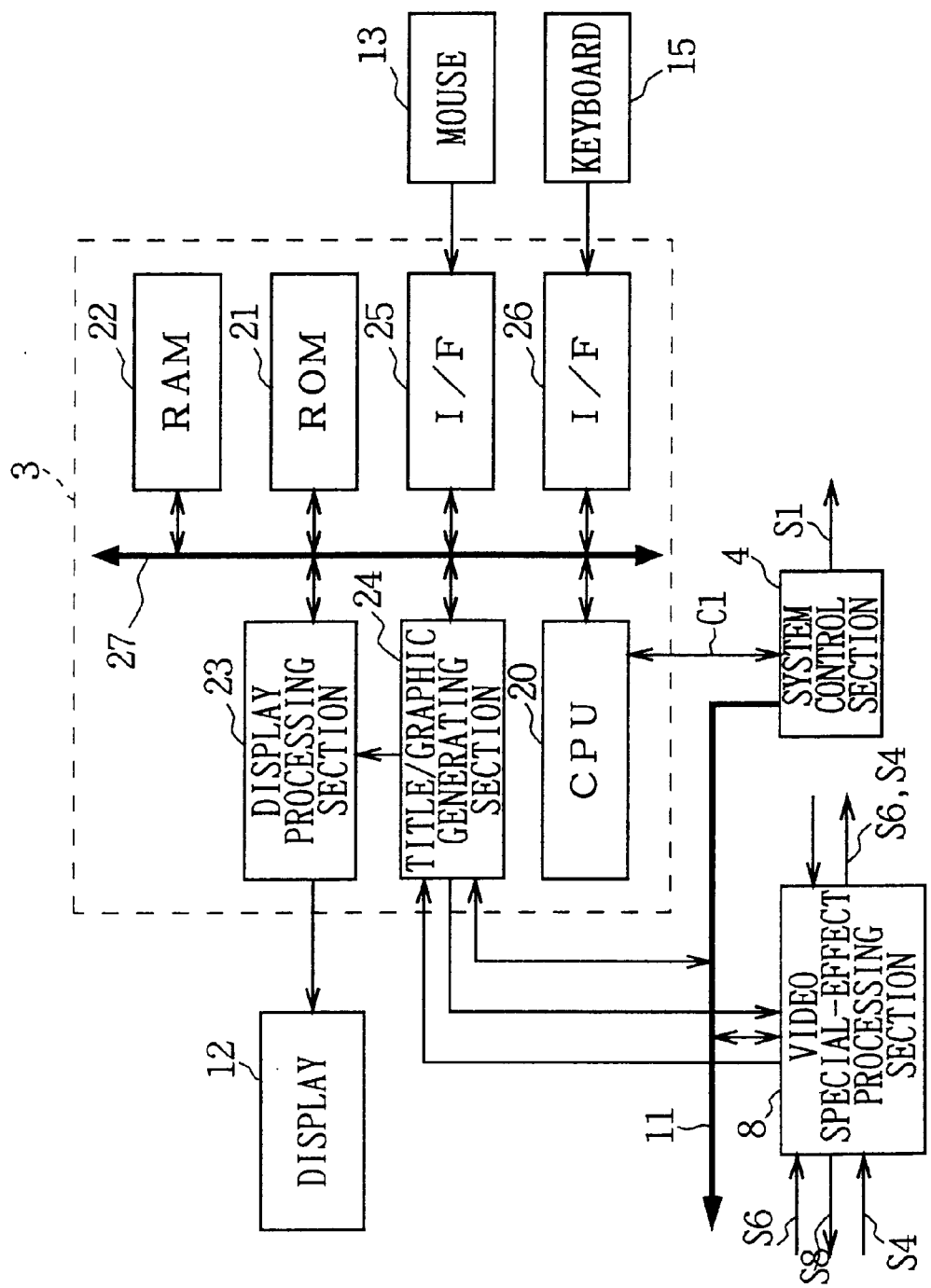
FIG. 2 is a block diagram showing the structure of a main control section.

As shown in FIG. 2, the main control section 3 is constituted by connecting a CPU (Central Processing Unit) 20, a ROM (Read Only Memory) 21, a RAM (Random Access Memory) 22, a display processing section 23, a tile/graphic generating section 24, and interface circuits 25 and 26 with a CPU bus 27 and connected to a mouse 13 and a keyboard 15 with the interface circuits 25 and 26.

In this case, when the mouse 13 or keyboard 15 is operated to give a predetermined-processing execution instruction via the interface circuits 25 and 26, the CPU 20 transmits a control command C1 to the system control section 4 in accordance with a program stored in the ROM 21 when necessary. Thereby, the CPU 20 makes the corresponding video tape recorder 14A to 14D, video input/output section 5, video output section 6, digital video and audio input/output section 7, video special-effect processing section 8, audio input/output and mixer section 9, and/or disk control section 10 execute a predetermined operation via the system control section 4. Thus, the editing apparatus 1 can execute the above-described various kinds of processing as a whole.

Moreover, in this case, the CPU 20 reads video data from the ROM 21 when necessary in accordance with the program stored in the ROM 21 and supplies the video data to the display 12 via the display processing section 23. Thereby, the display 12 displays the main screen or various windows to be described later and moreover, displays a cursor moving on the main screen correspondingly to mouse operation, numerals and letters input with the keyboard 15. Further, the display 12 displays video or still video according to the digital video signals S6 and S4 supplied to the display processing section 23 from the video special-effect processing section 8 via the title/graphic generating section 24 at predetermined positions of the main screen.

Furthermore, the CPU 20 controls the title/graphic generating section 24 when necessary to generate the section 24 generate title letters or video data for graphics in accordance with the program stored in the ROM 21 and transmit them to the video special-effect processing section 8.

(3) Processing of CPU on Main Screen

Figure 3:
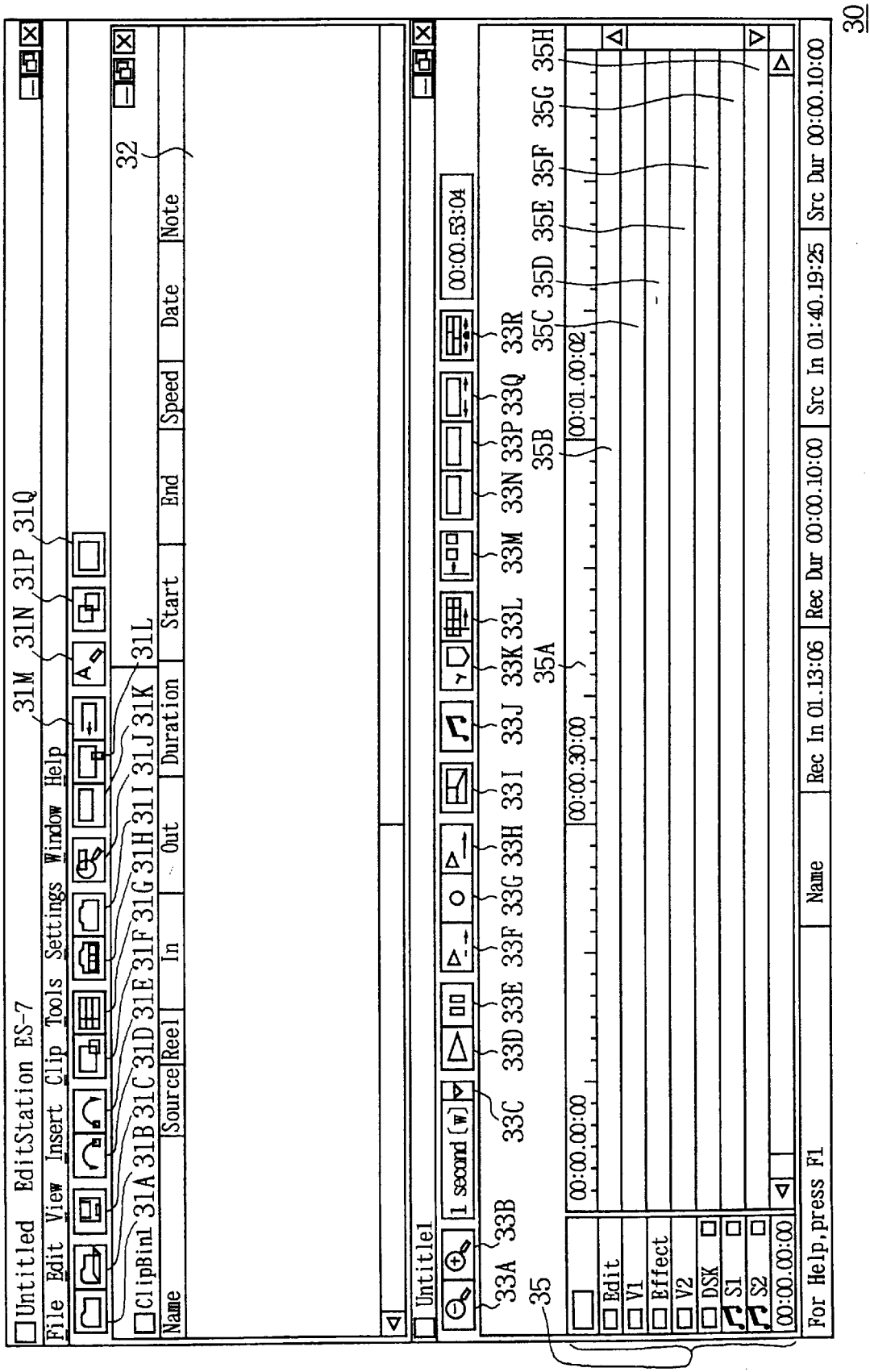
FIG. 3 is a schematic diagram showing a main screen.

Actually in this time, the CPU 20 first makes the display display a main screen 30 shown in FIG. 3 in accordance with the program stored in the ROM 21 when the CPU 20 drives by turning the power supply on.

In this case, the main screen 30 is provided with a plurality of buttons 31A to 31Q for an operator to select a desired processing, clip information display section 32 for displaying the data relating to the in-point, out-point, and material length of each registered clip, a plurality of buttons 33A to 33R for designating various kinds of processing for creating an editing list, and an editing-list creating section 35 for creating an editing list.

Figure 4:
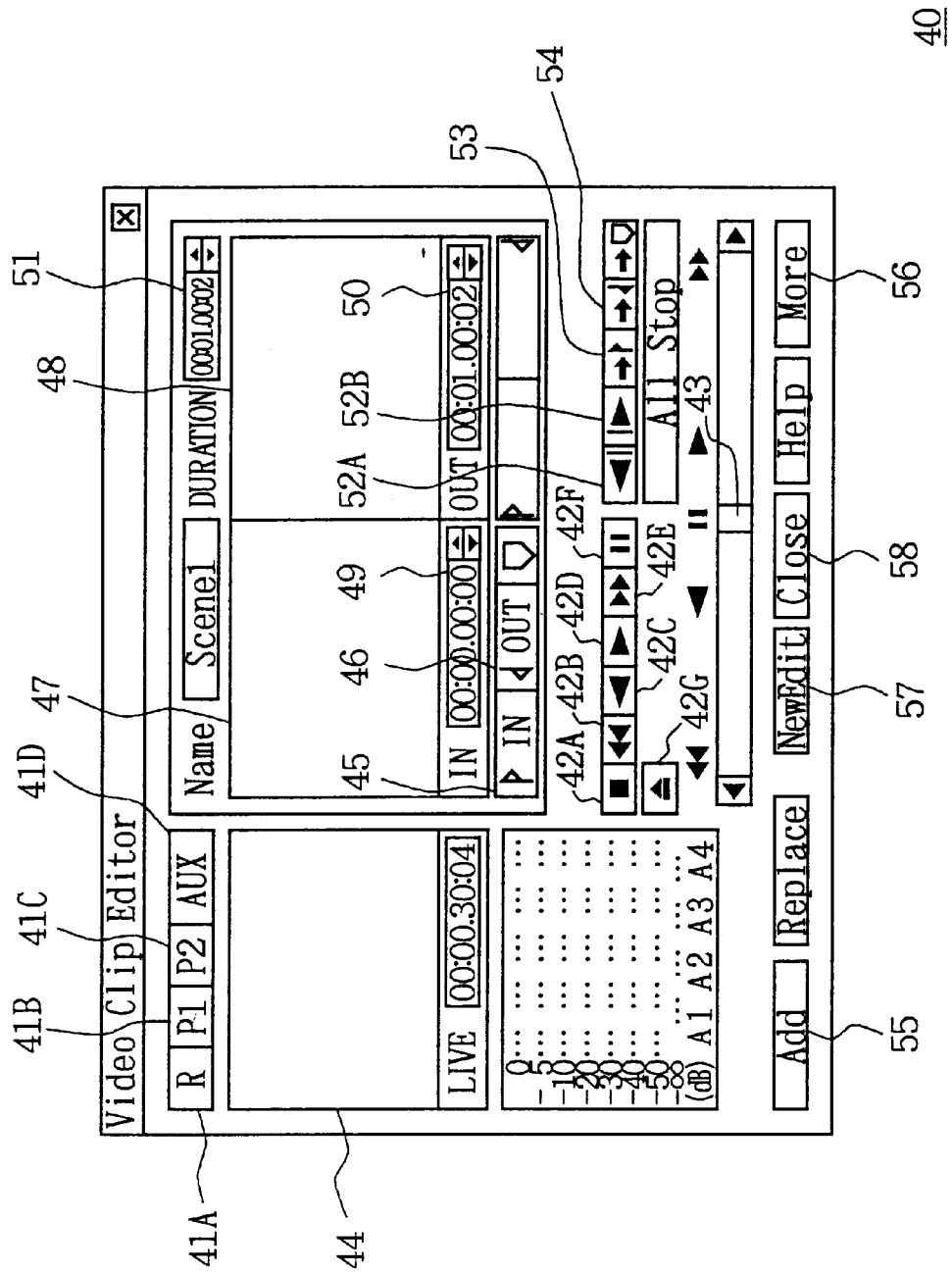
FIG. 4 is a schematic diagram showing a video clip edit window.

Moreover, when a video clip edit button 31K at the upper portion of the main screen 30 is selected by operating the mouse while the main screen 30 is displayed on the display 12, the CPU 20 makes the display 12 display a window (hereafter, referred to as a video clip edit window) 40 shown in FIG. 4 by overlapping the window on the main screen 30.

In this case, a plurality of source selection buttons 41A to 41D are displayed at the left upper portion of the video clip edit window 40 correspondingly to the video tape recorders 14A to 14D. Therefore, by selecting any one of the source selection buttons 41A to 41D by operating the mouse, it is possible to select a desired one of the video tape recorders 14A to 14D.

Moreover, when any one of the source selecting buttons 14A to 14D is selected and thereafter, any one of the video operating buttons 42A to 42G displayed on the video clip edit window 40 is selected by operating the mouse, the CPU 20 controls the corresponding video tape recorder 14A to 14D via the system control section 4 and thereby, makes the video tape recorder 14A to 14D execute operations corresponding to the selected video operating buttons 42A to 42G. Furthermore, also when a slider 43 on the video clip edit window 40 is operated, the CPU 20 similarly makes the corresponding video tape recorder 14A to 14D execute a designated operation.

Moreover, in this case, when making the video tape recorder 14A to 14D execute the reproducing operation or the variable-speed reproducing operation, video reproduced from a video tape by the video tape recorder 14A to 14D are displayed at a live video display section 44 on the video clip edit window 40.

Thus, an operator can designate the in-point and out-point of a video portion to be registered as a clip by clicking an in-point designating button 45 or an out-point designating button 46 while visually confirming the video displayed at the live video display section 44 and video of the in-point and out-point thus designated are displayed at the in-point video display section 47 and out-point display section 48 respectively.

Moreover, in this case, the time codes of each video designated as the in-point and out-point in a video tape is displayed at an in-point time code display section 49 and out-point time code display section 50 respectively, and the material length (duration) of a designated clip is displayed in a duration display section 51.

Furthermore, when frame feed buttons 52A and 52B on the video clip edit window 40 are selected by operating the mouse, the CPU 20 controls the corresponding video tape recorder 14A to 14D via the system control section 4 and thereby, frame-feed-displays a video displayed at the live video display section 44 in forward direction or backward direction. When live video moving buttons 53 and 54 are selected, the CPU 20 controls the corresponding video tape recorder 14A to 14D via the system control section 4 and thereby, moves the video displayed at the live video display section 44 up to the in-point or out-point.

Moreover, when a registering button 55 is selected by operating the mouse after designating the in-point and out-point of the clip as described above, the CPU 20 takes in the data relating to the time codes of the in-point and out-point, material length, and recording position (on a video tape or in the hard disk drive 2) of the clip, which are being displayed on the display 12, into the RAM 22 as a database and simultaneously displays the data relating to time codes of the in-point and out-point and material length of the clip thus registered at the clip information display section 32 of the main screen 30.

Moreover in this case, when a taking mode is previously selected by an operator on a not-illustrated setting screen to be opened by selecting a more button 56 of the video clip edit window 40, the CPU 20 controls the corresponding video tape recorder 14A/14D, the video input section 5 and audio input/output and mixer section 9 or the digital video and audio input/output section 7, the video special-effect processing section 8, and the disk control section 10 via the system control section 4 as described above and thereby, makes the hard disk drive 2 take in video and audio of the clip as described above and moreover, stores data showing that the recording position of the clip is included in the hard disk drive 2 into a corresponding position of the database (for example, a flag is set).

In this case, the CPU 20 makes the hard disk drive 2 take in the video signal and audio signal of the clip additionally by a predetermined period (e.g. 2 sec) before and after a designated range (that is, from a designated in-point up to a designated out-point). Moreover, in this case, when a link mode is previously selected on the above setting screen by an operator, the CPU 20 links a video with an audio as data to make the hard disk drive 2 take in the data. Moreover, when an unlink mode is selected, the CPU 20 makes the hard disk drive 2 take in a video and an audio without linking the video with the audio as data.

Thereafter, when a new edit button 57 is selected by operating the mouse, the CPU 20 returns the video clip edit window 40 to the initial state. Thereby, the operator can successively register other clips in accordance with the same procedure as the above mentioned.

Moreover, when a close button 58 is selected by operating the mouse, the CPU 20 makes the button 58 close the video clip edit window 40.

Furthermore, while the data relating to each registered clip is displayed at the clip list display section 32 on the main screen 30 as described above (FIG. 5), the operator can create an editing list in accordance with the following method by using the editing list creating section 35 on the main screen 30.

That is, a cursor is moved to the stage of a desired clip at the clip information display section 32 by operating the mouse, thereafter, one clip is designated by pressing a button of the mouse 13, under this state, the cursor is moved to a desired position in a first or second video track 35C or 35E, or a first or second audio track 35G or 35H by using the time scale 35A of the editing list creating section 35 as an index, and then the button of the mouse 13 is released.

Figure 6:
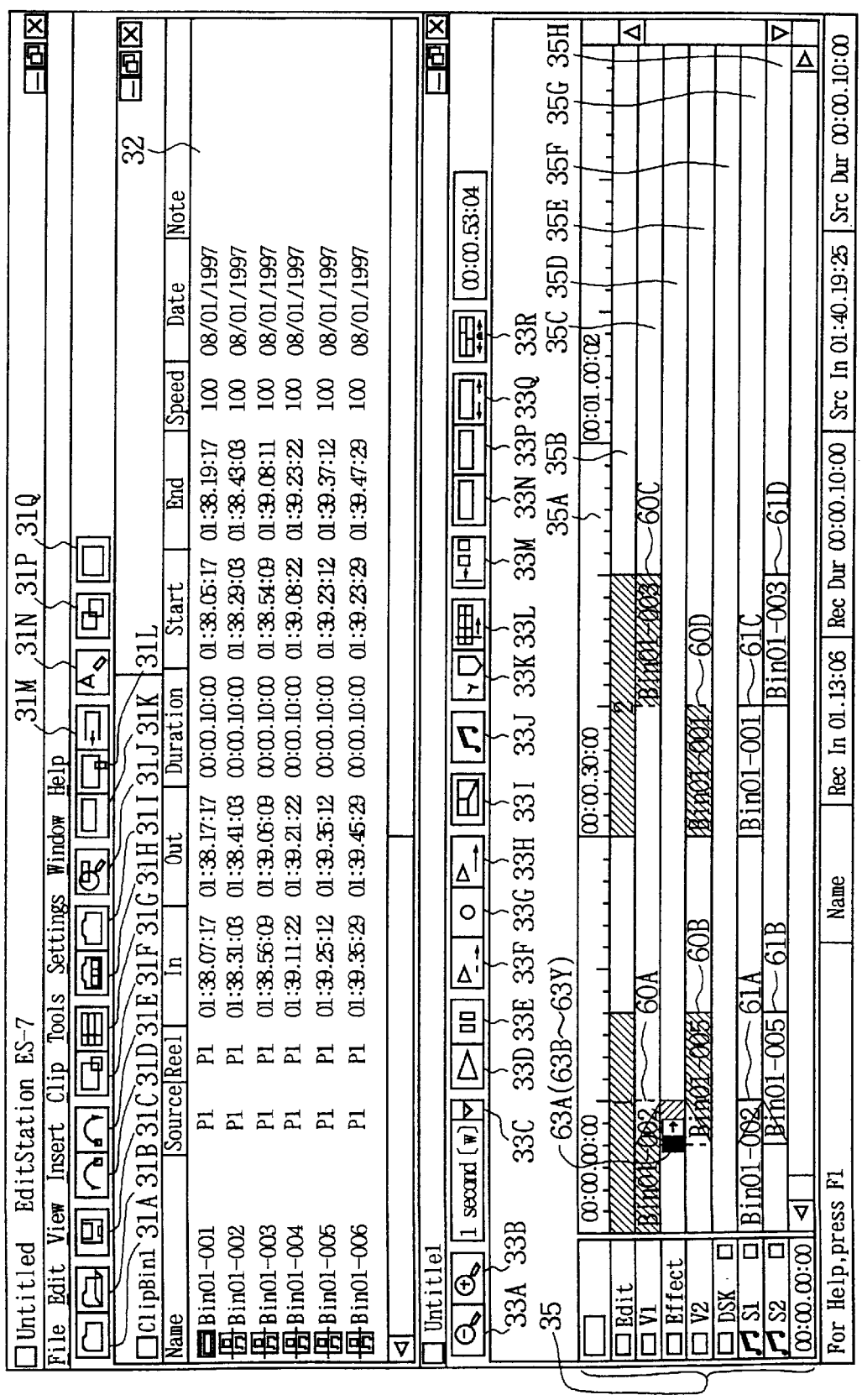
FIG. 6 is a schematic diagram showing a main screen.

As a result, the CPU 20 displays frames 60A to 60D and 61A to 61D having a length corresponding to the material length of the clip designated as described above on the first or second video track 35C or 35E, or the first or second audio track 35G or 35H after the position of the cursor as shown in FIG. 6. Moreover, when the video and audio of the then clip are linked with each other and registered, the CPU 20 displays frames 60A to 60D and 61A to 61D having the same length and at the same position on the time scale 35A as the frames 60A to 60D and 61A to 61D displayed on the first or second video track 35C or 35D or the first or second audio track 35G or 35H, on the first or second audio track 35G or 35H or the first or second video track 35C or 35E corresponding to the first or second video track 35C or 35E or the first or second audio track 35G or 35H in which the frames 60A to 60D and 61A to 61D are displayed.

Moreover, the operator repeats the above operations to successively display the frames 60A to 60D and 61A to 61D on the first or second video track 35C or 35E and the first or second audio track 35G or 35H so as to continue from the start ("00:00.00:00") of the time scale 35A up to a desired time code (that is, a desired time) on the time scale 35A.

In this case, the fact that the frames 60A to 60D and 61A to 61D are displayed on the first or second video track 35C or 35E or the first or second audio track 35G or 35H of the editing list display section 35 means that video or audio of the clips corresponding to the frames 60A to 60D and 61A to 61D is displayed or output at the time shown by the time scale 35A when edited video and audio are displayed or audio are output. Therefore, it is possible to create an editing list obtained by determining clip video or audio successively displayed as edited video or successively output as edited audio by the above operations.

When creating an editing list as described above, to apply the special-effect processing when the video of a first clip changes to the video of a second clip, one of the first and second video tracks 35C and 35E is made to display the first frames 60A to 60D corresponding to the preceding first clip (hereafter, referred to as from-clip) and the other of the second and first video tracks 35E and 35C is made to display the second frames 60A to 60D corresponding to the following second clip (hereafter, referred to as to-clip) so that time codes of some of the first frames 60A to 60D at the rear overlap those of some of the second frames 60A to 60D at the front in the time scale 35A.

Figure 7:
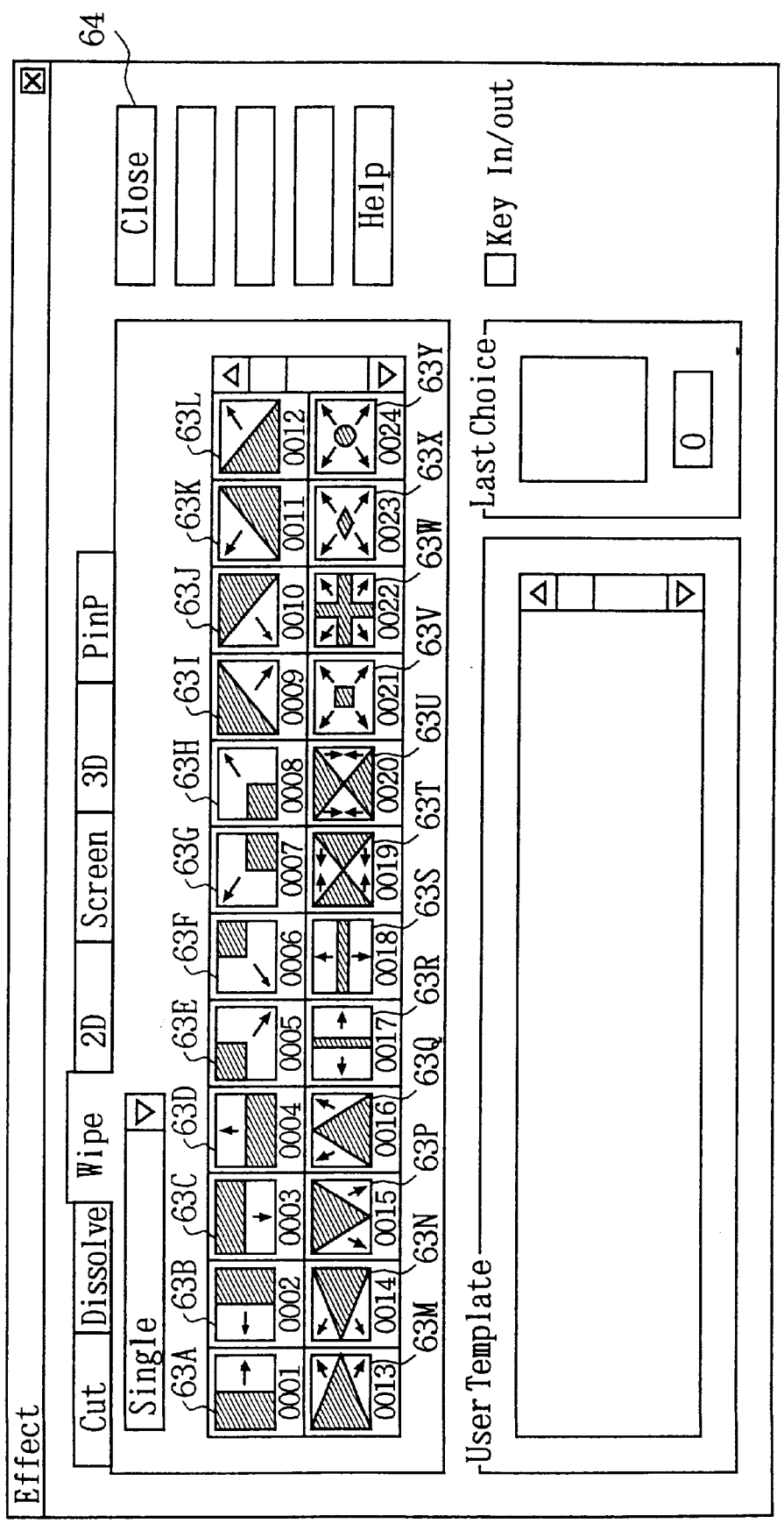
FIG. 7 is a schematic diagram showing a select effect window.

Then, a select effect button 33Q at the middle portion of the screen is clicked by operating the mouse. As a result, the CPU 20 displays a predetermined window (hereafter, referred to as a select effect window) 62 in which a plurality of icons 63A to 63Y showing the contents of various kinds of special processing which can be executed, on the main screen 30 as shown in FIG. 7.

Then, the cursor is moved onto one of the icons 63A to 63Y for a desired special-effect processing and thereafter, the button of the mouse 13 is pressed, and under this state, the cursor is moved to a portion where time codes of the first frames 60A to 60D displayed in one of the first and second video tracks 35C and 35E on the effect track 35D of the above-described editing list creating section 35 overlap those of the second frames 60A to 60D displayed on the other of the second and first video tracks 35E and 35C on the time scale 35A, and the. button of the mouse 13 is released.

As a result, the CPU 20 moves the icons 63A to 63Y displayed on the select effect window 62 together with the cursor on the screen and displays the icons 63A to 63Y in the state in which the icons are pasted to the position where the button of the cursor 13 is released.

Thereby, it is possible to input an instruction for executing a special-effect processing corresponding to the icon 63A to 63Y pasted as above at the connective portion between the video of the clips corresponding to the first frames 60A to 60D displayed on the one of the first and. second video tracks 35C and 35E and the video of the clips corresponding to the second frames 60A to 60D displayed on the other of the second and first video tracks 35E and 35C.

Moreover, when the close button.64 is selected by operating the mouse, the CPU 20 makes the close button 64 close the select effect window 62 on the main screen 20.

Furthermore, when the preview button 33D displayed at the middle portion of the main screen 30 is selected by operating the mouse after or when creating an editing list as described above, the CPU 20 controls the corresponding video tape recorder 14A to 14D, video input section 5, video output section 6, digital video and audio input/output section 7, video special-effect processing section 8, audio input/output and mixer section 9, and/or disk control section 10 via the system control section 4 according to necessity as described above and thereby, displays edited video based on the editing list on the monitor 16 and outputs edited audio based on the editing list from a speaker.

Furthermore, when a recording button 33G displayed at the middle portion of the main screen 30 is selected after creating the editing list as described above, the CPU 20 controls the corresponding video tape recorder 14A to 14D, video input section 5, video output section 6, digital video and audio input/output section 7, video special-effect processing section 8, audio input/output and mixer section 9, and/or disk control section 10 according to necessity via the system control section 4 as described above and thereby, executes the edition processing based on the editing list and records the edited video and audio thus obtained on a video tape via the video tape recorder 14A to 14D previously designated by the operator.

Figure 5:
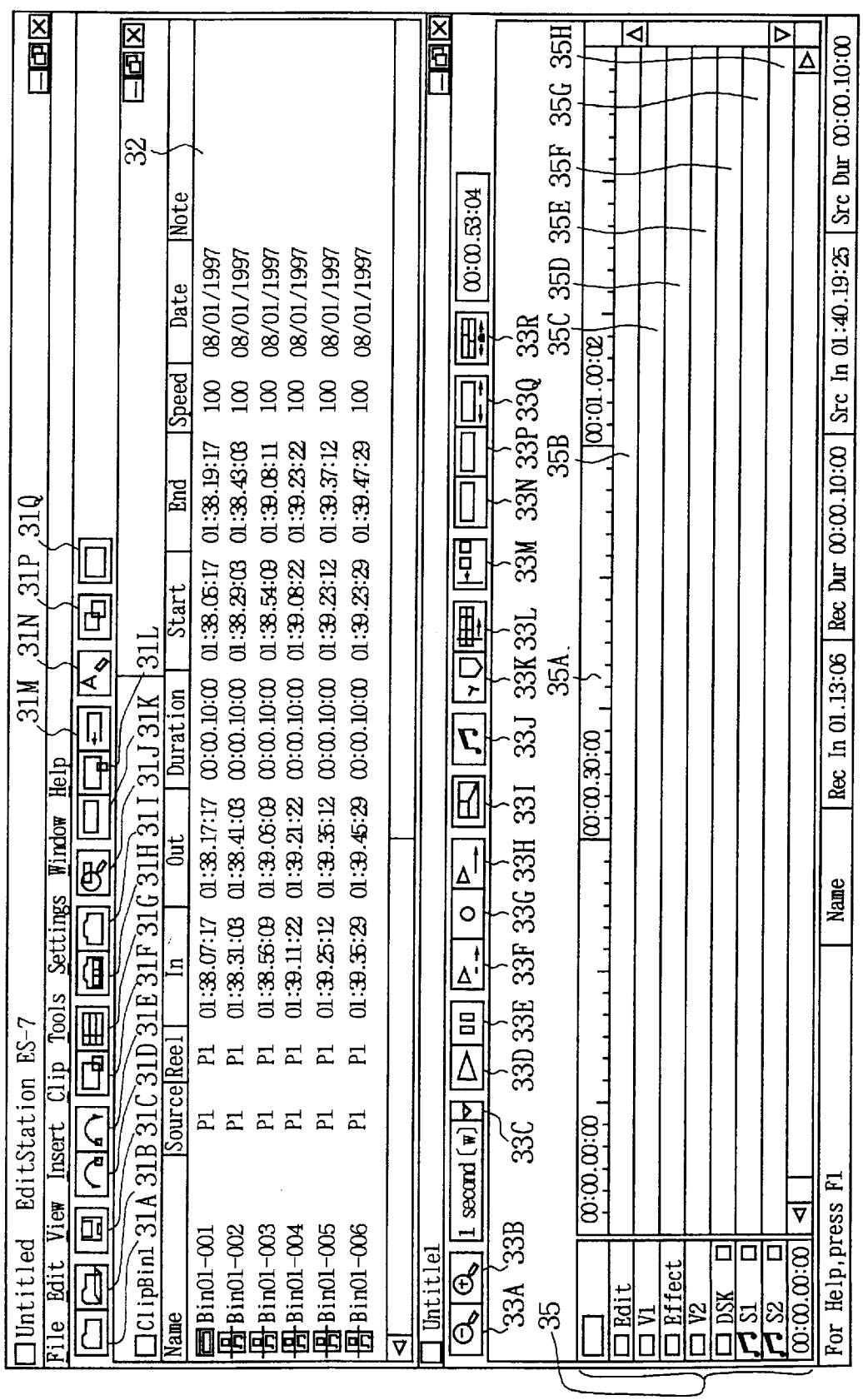
FIG. 5 is a schematic diagram showing a main screen.
Figure 8:
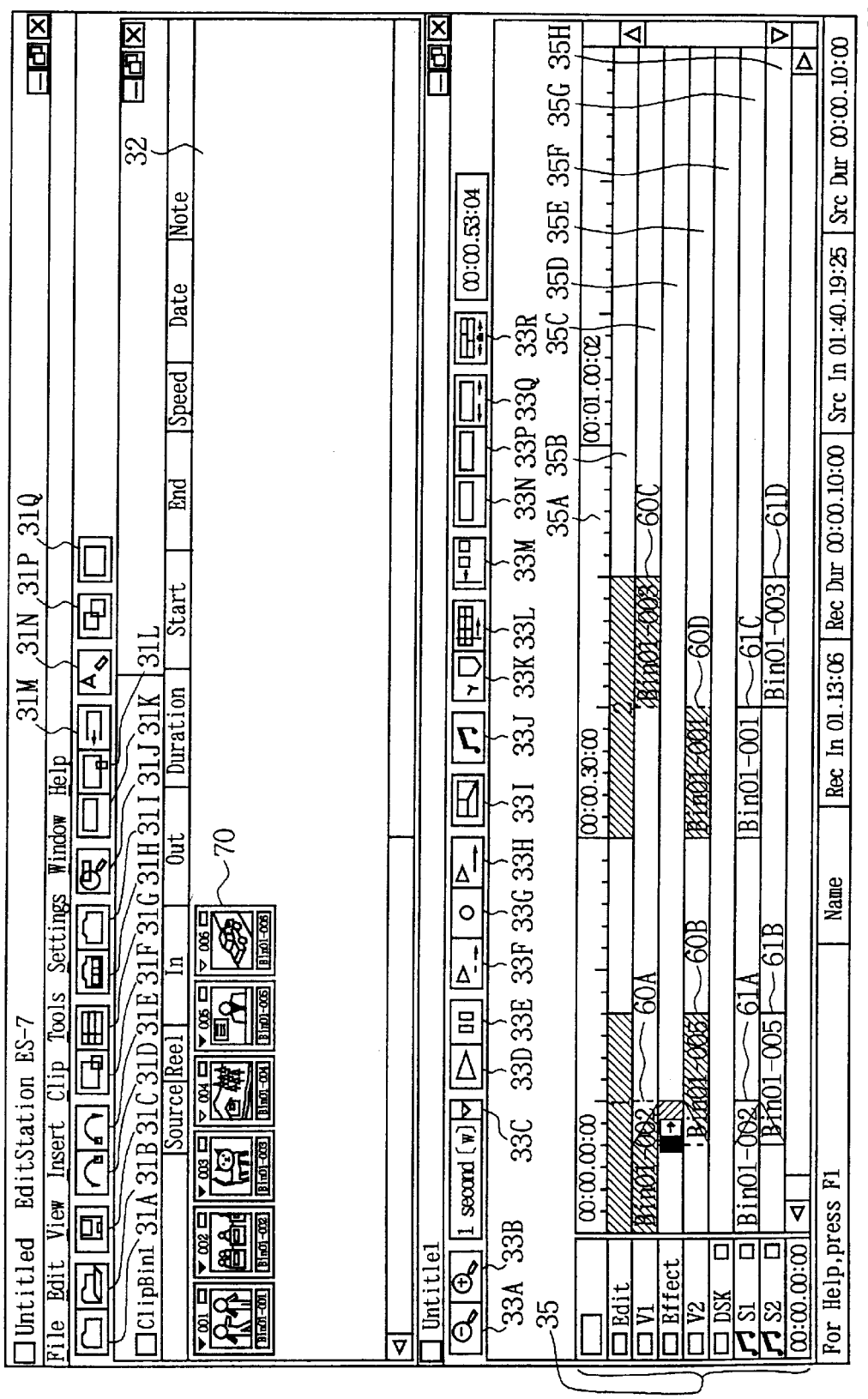
FIG. 8 is a schematic diagram showing a main screen.

In addition to the above structure, the editing apparatus 1 makes it possible to select a view picture button 31I set to the upper portion of the main screen 30 by operating the mouse while displaying data relating to clops at the clip information display section 32 on the main screen 30 as shown in FIG. 5 or 6 and thereby, display the in-point video of each clip at the clip information display section 32 in place of the data relating to each clip, as shown in FIG. 8.

Figure 9:
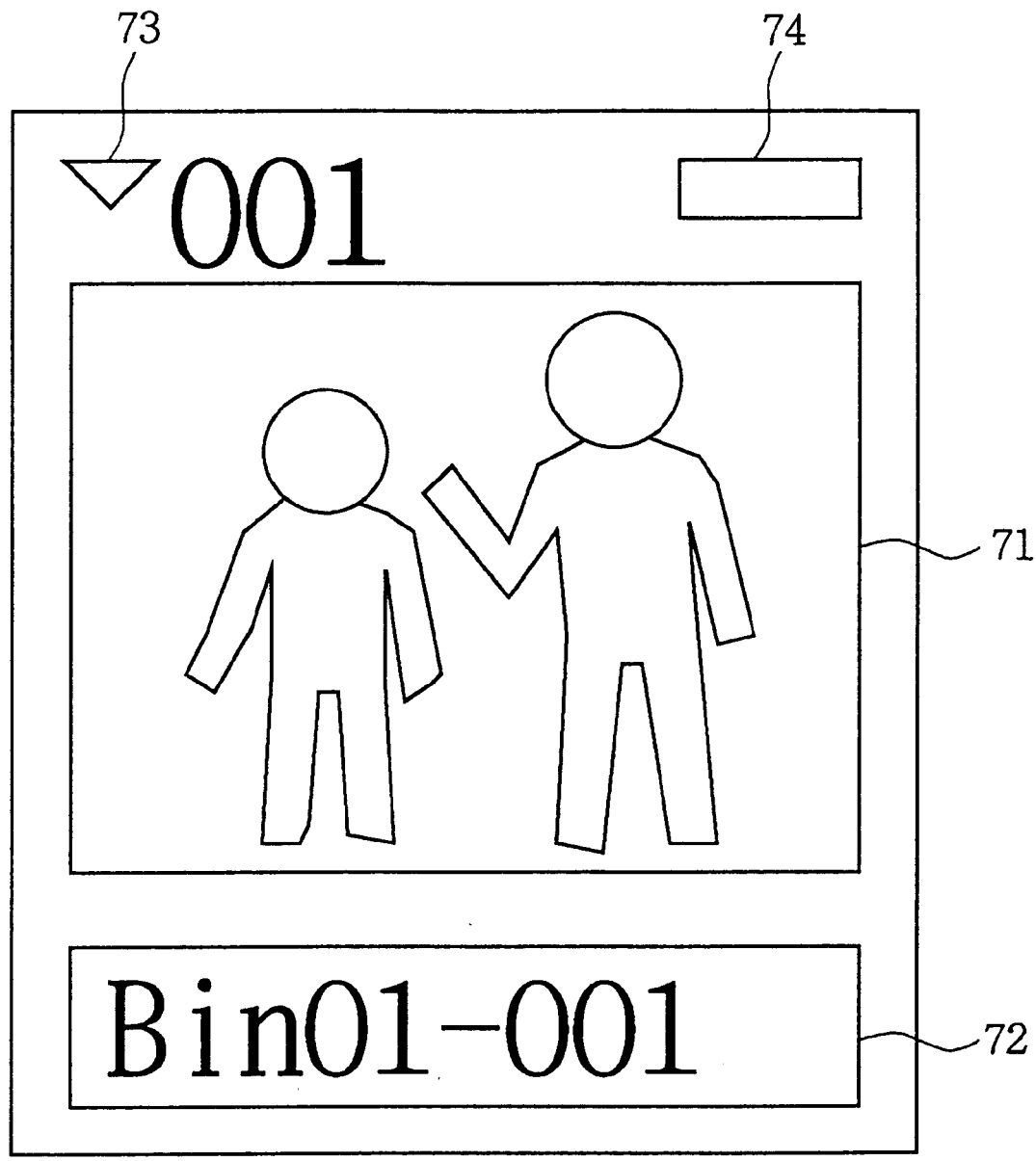
FIG. 9 is a schematic diagram showing an in-point video character.

Actually, when the view picture button 31I is selected while data relating to the clip is displayed at the clip information display section 32, the CPU 20 transmits the control command C1 corresponding to the button 31I to the system control section 4 and thereby, makes the corresponding video tape recorder 14A to 14D and/or the hard disk drive 2 reproduce the in-point video of each clip being displayed at the clip display section 32, and moreover inserts the in-point video of each clip thus obtained into the video display section 71 of an in-point video display character 70 shown in FIG. 9, in order to display the video in the list-up sequence of the clip information display section 32 in place of the data relating to each clip.

Moreover, when the file name of the clip is displayed at a file name display section 72 of the in-point video display character 70 and the corresponding frames 60A to 60D and 61A to 61D are displayed on the first or second video track 35C or 35E or the first or second audio track 35G or 35H of the editing list display section 35 (that is, the clip is registered in the editing list), the CPU 20 tints an inverse-triangular first mark 73 displayed at the top left portion of the in-point video display character 70 with blue.

Then, the operator moves the cursor onto the in-point video display character 70 of a desired clip displayed at the clip information display section 32 on the main screen 30 under the above state, designates one clip by pressing the button of the mouse 13, under this state, moves the cursor to a desired position within the first or second video track 35C or 35E or the first or second audio track 35G or 35H of the editing list creating section 35, and thereafter releases the button of the mouse 13. Thus, it is possible to display the frames 60A to 60D and 61A to 61D having a length corresponding to the material length of the designated clip after the then position of the cursor.

Thus, the operator can register the clip in the editing list and successively register desired clips in the editing list by repeating the same operation.

Moreover, in this case, the CPU 20 successively tints a first mark 72 at the top left of the corresponding in-point video display character 70 in the clip information display section 32 with blue in the same manner as the above.

Thereby, in the editing apparatus 1, the operator can easily decide whether the clip is already registered in the editing list, in accordance with the color of the first mark 73 in each in-point video display section 70 displayed at the clip information display section 32.

In the case of the embodiment, when video and audio of a clip are taken into the hard disk drive 2, the CPU 20 displays a rectangular second mark 74 displayed at the top right of the in-point video display character 70 corresponding to the clip by tinting the mark 74 with green. However, when video and audio of the clip are not taken into the hard disk drive 2, the CPU 20 displays the second mark 74 of the in-point video display character 70 corresponding to the clip without tinting it.

Thereby, in the case of the editing apparatus 1, the operator can easily recognize the storage place (that is, a hard disk or video tape) of a corresponding clip in accordance with the second mark 74.

(4) Mark Display Procedure

Figure 10:
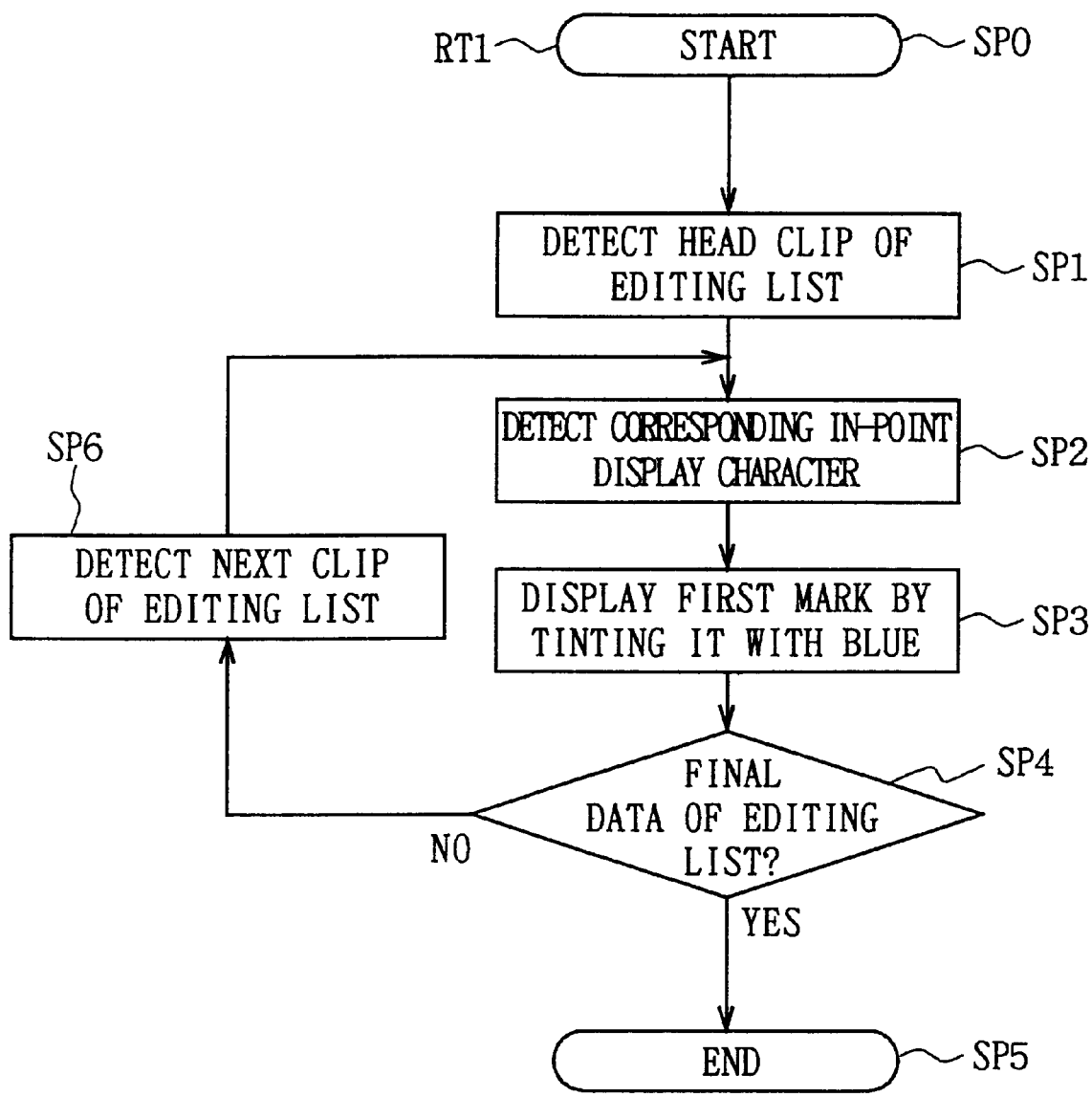
FIG. 10 is a flow chart showing a mark display procedure.

In this case, the CPU 20 practically tints a first mark of each in-point video display character 70 displayed at the clip information display section 32 with blue when necessary in accordance with the mark display procedure RT1 shown in FIG. 10.

That is, when the view picture button 33I is selected while the data relating to clips is displayed at the clip information, display section 32 of the main screen 30, the CPU 20 displays the in-point video display character 70 including an in-point video corresponding to each clip at the clip information display section 32, then starts the mark display procedure RT1 in step SP0. In the following step SP1, the CPU 20 detects a clip corresponding to the head frame 60A to 60D, 61A to 61D out of the frames 60A to 60D and 61A to 61D displayed on the first or second video track 35C or 35E or the first or second audio track 35G or 35H of the editing list creating section 35.

Then, in step SP2, the CPU 20 detects the in-point video display character 70 corresponding to the clip in accordance with the database stored in the RAM 22.

Then, in step SP3, the CPU 20 displays the first mark 73 in the in-point video display character 70 by tinting the mark 73 with blue. Thereafter, in step SP4, the CPU 20 decides whether the clip is the final one of clips registered in the editing list created until then by using the editing list creating section 35.

In this case, obtaining an affirmative result in step SP4 means that the first mark 73 of each in-point video display character 70 corresponding to each clip registered in the editing list until then among all the in-point video display characters 70 displayed at the clip information display section 32 is tinted with blue. In this case, the CPU 20 completes the mark display procedure RT1 in step SP 5.

However, obtaining a negative result in step SP4 means that the first mark 73 of each in-point video display character 70 corresponding to each clip registered in the editing list until then among all the in-point video display characters 70 displayed at the clip information display section 32 is not tinted with blue. In this case, the CPU 20 detects the next clip registered in the editing list in step SP6 and then returns to step SP2, and repeatedly executes steps SP2 to SP6 until an affirmative result is obtained in step SP4. Then, when the CPU 20 obtains an affirmative result in step SP4, it completes the mark display procedure RT1 in step SP5.

Moreover, the CPU 20 executes the mark display procedure RT1 whenever a clip corresponding to any one of the in-point video display characters 70 displayed at the clip information display section 32 is registered in the editing list (that is, whenever the corresponding frames 60A to 60D and 61A to 61D corresponding to the clip are displayed on the first or second video track 35C or 35E or the first or second audio track 35G or 35H of the editing list creating section 35).

In this way, the CPU 20 displays the first mark 73 of the in-point video display section 70 in which a corresponding clip is registered in the editing list out of the in-point video display characters 70 displayed at the clip information display section 32 of the main screen 30 by tinting the mark 73 with blue.

(5) Operations and Advantages of This Embodiment

According to the above structure, the editing apparatus 1 makes it possible to display the in-point video display character 70 including the in-point video of each clip at the clip information display section 32 instead of the data relating to each clip being displayed at the clip information display section 32 by selecting the view picture button 33I on the main screen 30.

In this case, the first mark of the in-point video display character 70 corresponding to each clip registered in the editing list out of the in-point video display characters 70 is tinted with blue and displayed.

Moreover, it is possible to register a desired clip in the clip information display section 32 in the editing list by moving the cursor onto the in-point video display character 70 corresponding to the clip and pressing the button of the mouse 13, and under the above state, moving the cursor to a desired position on the first or second video track 35C or 35E or the first or second audio track 35G or 35H of the editing list creating section 35 by operating the mouse, and then releasing the button of the mouse 13. In this case, the first mark of the in-point video display character 70 corresponding to the clip is tinted with blue and displayed.

Therefore, in the editing apparatus 1, the operator can easily and securely decide whether the clip is registered in the editing list in accordance with the color of the first mark 73 of each in-point video display character 70 displayed at the clip information display section 32 and thereby, it is possible to easily and immediately identify video and audio of unnecessary clip taken into the hard disk drive 2.

According to the above structure, an operator can easily and securely decide whether a corresponding clip is registered in an editing list because the first mark 73 of the in-point video display character 70 in which the corresponding clip is registered in the editing list out of the in-point video display characters 70 displayed at the clip information display section 32 is tinted with blue and displayed. Therefore, the operator can easily and immediately identify video and audio of an unnecessary clip taken into the hard disk drive 2 and thus, it is possible to realize an editing apparatus capable of remarkably improving the manipulability.

(6) Other embodiments

In the case of the above embodiment, a case is described in which the present invention is applied to thse editing apparatus 1 constituted as shown in FIG. 1. However, the present invention is not restricted to the above case. The present invention can be widely applied to editing apparatuses capable of creating an editing list specifying an editing sequence by registering a desired portion of a video signal and/or audio signal as a material to be edited (that is, a clip) and using the registered material to be edited.

Moreover, in the case of the above embodiment, a case is described in which the in-pin video of an registered clip can be displayed at the clip information display section 32 by selecting the view picture button 331 on the main screen 30. However, the present invention is not restricted to the above case. It is also possible to constitute the editing apparatus 1 so as to display, for example, an out-point video or a video of a clip previously designated by an operator other than an in-point video at the clip information display section 32.

Furthermore, in the case of the above embodiment, a case is described in which, to display the in-point video of an registered clip at the clip information display section 32, when the clip is used for an editing list, the first mark 73 is tinted with blue and displayed. However, the present invention is not restricted to the above case. It is also possible to display the first mark 73 by tinting it with a color other than blue. Moreover, it is possible to display other decision information capable of easily deciding whether the clip of letters, graphics or marks having other shapes instead of the first mark 73 is used for an editing list.

Furthermore, in the case of the above embodiment, a case is described in which, to display the in-point video of an registered clip at the clip information display section 32, when the clip is used for an editing list, only the first mark 73 is tinted with blue and displayed. However, the present invention is not restricted to the above case. It is also possible to display all the in-point video display characters 70 or some of the characters 70 other than the first mark 73 by tinting them with blue or another color.

Furthermore, in the case of the above embodiment, a case is described in which, when displaying the in-point video as prescribed information relating to a registered clip, it is displayed whether the clip is used for an editing list. However, the present invention is not restricted to the above case. It is also possible to display the whole or some of display information with a predetermined color so as to be able to decide whether a clip registered at the clip information display section 32 is used for an editing list even when the data relating to the clip or other information is displayed, or to display decision information capable of deciding whether the clip is used for an editing list by making the information correspond to relating data.

Furthermore, in the case of the above embodiment, a case is described in which the present invention is applied to the editing apparatus 1 capable of taking video and audio recorded on a video tape into a hard disk. However, the present invention is not restricted to the above case. It is also possible to widely apply the present invention to various types of editing apparatuses capable of taking video and audio into various disc recording media or other recording media.

In an editing apparatus for registering a desired portion of a video and/or audio signal as a material to be edited so that an editing list specifying an editing sequence can be created in accordance with the registered material to be edited, display means for displaying predetermined information relating to the registered material to be edited is provided. The display means displays some or the whole of the information relating to a material to be edited used for an editing list out of the predetermined information relating to the registered material to be edited with a predetermined color, or displays predetermined decision information capable of deciding whether the material to be edited is used for the editing list by making the decision information correspond to information. Therefore, an operator can immediately and securely decide whether the material to be edited is used for the editing list in accordance with the color of the information relating to each displayed material to be edited or corresponding decision information. Thus, it is possible to realize an editing apparatus capable of remarkably improving the manipulability.

INDUSTRIAL APPLICABILITY

The editing apparatus according to the present invention can be utilized for a non-linear editing apparatus which creates an editing list based on a video and audio signal taken into a disc recording medium such as a hard disk as digital information.

What is claimed is:

1. An editing apparatus capable of registering a desired portion of a video or audio signal as material to be edited and creating an editing list specifying an editing sequence in accordance with the registered material to be edited, the apparatus comprising:

memory storage means for storing the registered material to be edited and an addition portion of the video or audio signal of a predetermined period before and after said desired portion; and display means for displaying prescribed information on the stored registered material stored in said memory storage means, wherein said display means, out of said prescribed information on the stored registered material, displays some or the whole of said prescribed information on the stored registered material used for said editing list with a prescribed color, or displays prescribed decision information capable of deciding whether said stored material is used for said editing list by making the prescribed decision information correspond to said information.

2. The editing apparatus according to claim 1, wherein said display means displays the video for a prescribed portion of said material to be edited and moreover, displays the mark having said prescribed color nearby said video of said material to be edited used for said editing list.

* * * * *